US006751714B2

(12) United States Patent
Milillo et al.

(10) Patent No.: US 6,751,714 B2
(45) Date of Patent: *Jun. 15, 2004

(54) SYSTEMS AND METHODS FOR RELOCATION OF COMPRESSED DATA TRACKS

(75) Inventors: Michael S. Milillo, Louisville, CO (US); Christopher J. West, Boulder, CO (US)

(73) Assignee: Storage Technology Corporation, Louisville, CO (US)

(*) Notice: Subject to any disclaimer, the term of this patent is extended or adjusted under 35 U.S.C. 154(b) by 303 days.

This patent is subject to a terminal disclaimer.

(21) Appl. No.: 09/918,227

(22) Filed: Jul. 30, 2001

(65) Prior Publication Data

US 2001/0047461 A1 Nov. 29, 2001

Related U.S. Application Data

(63) Continuation of application No. 09/261,826, filed on Mar. 3, 1999, now abandoned, which is a continuation-in-part of application No. 09/243,085, filed on Feb. 2, 1999, now abandoned.

(51) Int. Cl.[7] .............................................. G06F 12/06
(52) U.S. Cl. ........................ 711/162; 711/165; 711/161
(58) Field of Search ................... 711/162, 165, 711/112, 111, 114, 161; 714/799, 807, 6, 11; 707/204, 200

(56) References Cited

U.S. PATENT DOCUMENTS

| 5,072,378 | A |   | 12/1991 | Manka |
|-----------|---|---|---------|-------|
| 5,193,184 | A |   | 3/1993  | Belsan et al. |
| 5,394,534 | A |   | 2/1995  | Kulakowski et al. |
| 5,403,639 | A |   | 4/1995  | Belsan et al. |
| 5,555,371 | A |   | 9/1996  | Duyanovich et al. |
| 5,615,329 | A |   | 3/1997  | Kern et al. |
| 5,630,092 | A |   | 5/1997  | Carreiro et al. |
| 5,761,678 | A | * | 6/1998  | Bendert et al. ............. 711/162 |
| 5,829,046 | A | * | 10/1998 | Tzelnic et al. ............. 711/162 |
| 6,058,462 | A | * | 5/2000  | West et al. ................. 711/162 |
| 6,092,071 | A |   | 7/2000  | Bolan et al. |
| 6,119,208 | A |   | 9/2000  | White et al. |
| 6,351,792 | B1| * | 2/2002  | Milillo ....................... 711/162 |
| 6,434,720 | B1| * | 8/2002  | Meyer ........................ 714/820 |
| 6,446,175 | B1| * | 9/2002  | West et al. ................. 711/162 |

* cited by examiner

*Primary Examiner*—Pierre Bataille
(74) *Attorney, Agent, or Firm*—Wayne P. Bailey

(57) ABSTRACT

Systems and methods are provided to backup, restore and relocate compressed data images, e.g., DASD compressed tracks, associated with virtual storage volumes. A compressed track image of the data is first stored in a storage volume. The data derives from a connected host connected with a control unit that manages the storage volume. When the host data is uncompressed, the control unit compresses the data. In backup, the host reads the compressed data with a read protocol and the control unit assigns metadata to the compressed track. The compressed track is then stored in a backup device, e.g., a tape drive. In restore, the host writes the compressed track to the control unit with a write protocol. If desired, the track is relocated to a different location or to a different storage volume through the associated metadata. In decompression, a seed value is assigned to the data to ensure identification across relocation.

33 Claims, 4 Drawing Sheets

SYSTEMS AND METHODS FOR RELOCATION OF COMPRESSED DATA TRACKS

RELATED APPLICATIONS

This is a continuation of application Ser. No. 09/261,826 filed Mar. 3, 1999 now abandoned.

This application is a continuation-in-part of commonly-owned U.S. application Ser. No. 09/243,085, filed on Feb. 2, 1999, now abandoned entitled "Selective Remote Storage Copy System and Methods," and herein incorporated by reference.

FIELD OF THE INVENTION

The invention relates to data compression, and particularly to relocating compressed data tracks to and from storage devices.

BACKGROUND OF THE INVENTION

Methods of sending compressed data from a disk subsystem to a host are well known in the prior art. Nevertheless, such methods are currently limited in that the compressed track is restored, i.e., written by the host, at the same storage location from which the track was read. While this may be acceptable for disk volume backup and restore, it is unacceptable for the backup and restore of application data sets that are backed up from one location and restored to another location.

More particularly, application data sets are seldom restored to the disk location from where they were originally backed up. By way of one example, data sets are sometimes deleted after backup and the corresponding disk space is used for another data set; and it can be undesirable to over-write the new data with restored data. By way of another example, utilities that compact volumes to make contiguous areas of free space move data sets around; and it can be undesirable to perform an additional backup simply because the data set was moved.

It is, accordingly, one object of the invention to provide methods for relocating compressed data tracks without the above-described problems. One specific object of the invention is to provide methods and systems for relocating compressed data tracks to and from Direct Access Storage Devices ("DASD"). A further object of the invention is to provide methods and systems to relocate compressed tracks, selectively, to compatible storage volumes. These and other objects will become apparent in the description that follows.

SUMMARY OF THE INVENTION

U.S. Pat. Nos. 5,615,329, 5,072,378 and 5,193,184 relate to storage systems, remote data duplex and/or virtual data storage, and provide useful background information for the invention. U.S. Pat. Nos. 5,615,329, 5,072,378 and 5,193,184 are thus herein incorporated by reference.

In one aspect, the systems and methods of the invention transfer compressed track images to the host with support information that provides for relocating the tracks from the source disk location to the new location, if desired, with a different track, a different cylinder, and/or a different disk in the format of the source track. In one specific aspect, data stored in compressed form is read by the host using a read protocol to read the compressed data; and that data is preceded by metadata that self-defines the track. The metadata solves the relocation problem of the prior art by creating a description of a compressed track that is invariant with its currently assigned location on a virtual volume. When the compressed track is written using a write protocol to write a compressed track, the metadata is used to restore the track in its newly assigned location on a different virtual volume, if desired.

In another aspect, when a compressed track is decompressed, a seed value in the metadata provides an identification tag for the data. This identification tag remains valid across relocation for data that is stored to a new location and subsequently decompressed.

In one aspect, the invention provides for relocating compressed tracks of different sizes so long as the new location has a compatible format and size with the original location at the time host-compressed track was read. This aspect is particularly useful in supporting IBM DASD systems such as model 3380-J and 3390-3, as these storage systems provide for different track sizes.

In certain aspects, the systems and methods of the invention also permit compression and alternatively decompression of data to and from the host, similar to storage systems in existence in the prior art. However, sending and receiving compressed data images from a storage volume with the host for purposes of backup and restore exemplifies one important advantage of the invention. Backup and restore data can then be moved quickly between the backup drive, e.g., a tape drive, and the storage volume. Further, with the invention, compressed data tracks from the backup device can be relocated to other locations in the virtual volume—also an advantage over the prior art.

In still another aspect, the invention provides a method for relocating data to a storage volume, including the steps of: storing a compressed track image of the data at a first location in a first storage volume; tagging metadata to the compressed track image; transmitting the compressed track image to a host; and storing the compressed track image at a second location in a second storage volume according to the metadata.

The method can also include the step of backing up the compressed track image in a storage device after transmitting the compressed track image to a host.

The method can further include the step of compressing the data prior to storing the compressed track image at the first location.

In other aspects, the first and second locations can be identical; and the first and second storage volumes can be the same.

In yet another aspect, the method includes decompressing the compressed track image and assigning a seed value to the metadata, so that the data remains identifiable across relocation.

In one aspect, the method includes the step of automatically modifying a count field of the compressed track image to match the second location.

In another aspect, the step of transmitting is preceded by the step of reading the compressed track image by a Read Protocol. The Read Protocol can include executing one or more of Define Extent, Locate Record and Read Track Commands.

In still another aspect, the step of storing includes the step of writing the compressed track by a Write Protocol. The Write Protocol can include executing one or more of Define Extent, Locate Record, Write, and Write Next Commands. In a preferred aspect, the step of writing by a Write Protocol includes the step of specifying the second location through a count field preceding the compressed track image.

In another aspect, the invention includes a system for backup and relocation of compressed track images. A host connects to a control unit, which stores the data as a compressed track image in a storage volume. The control unit responds to a read command from the host to transmit the compressed track image to the host; and the control unit assigns metadata to the image. The control unit responds to a read command from the host to restore the compressed track image into a location corresponding to the metadata. In restore, therefore, the compressed track is relocated, if desired.

In another aspect, the system includes a backup storage device to backup data from the storage volume.

In other aspects, the host includes read protocol logic to read the compressed track image from the control unit; and write protocol logic to restore the compressed track image to the storage volume.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which:

FIG. 4 illustrates a track image restored to a storage volume and preceded by metadata and a seed value, in accord with the invention.

DETAILED DESCRIPTION OF THE DRAWINGS

Figure 1:
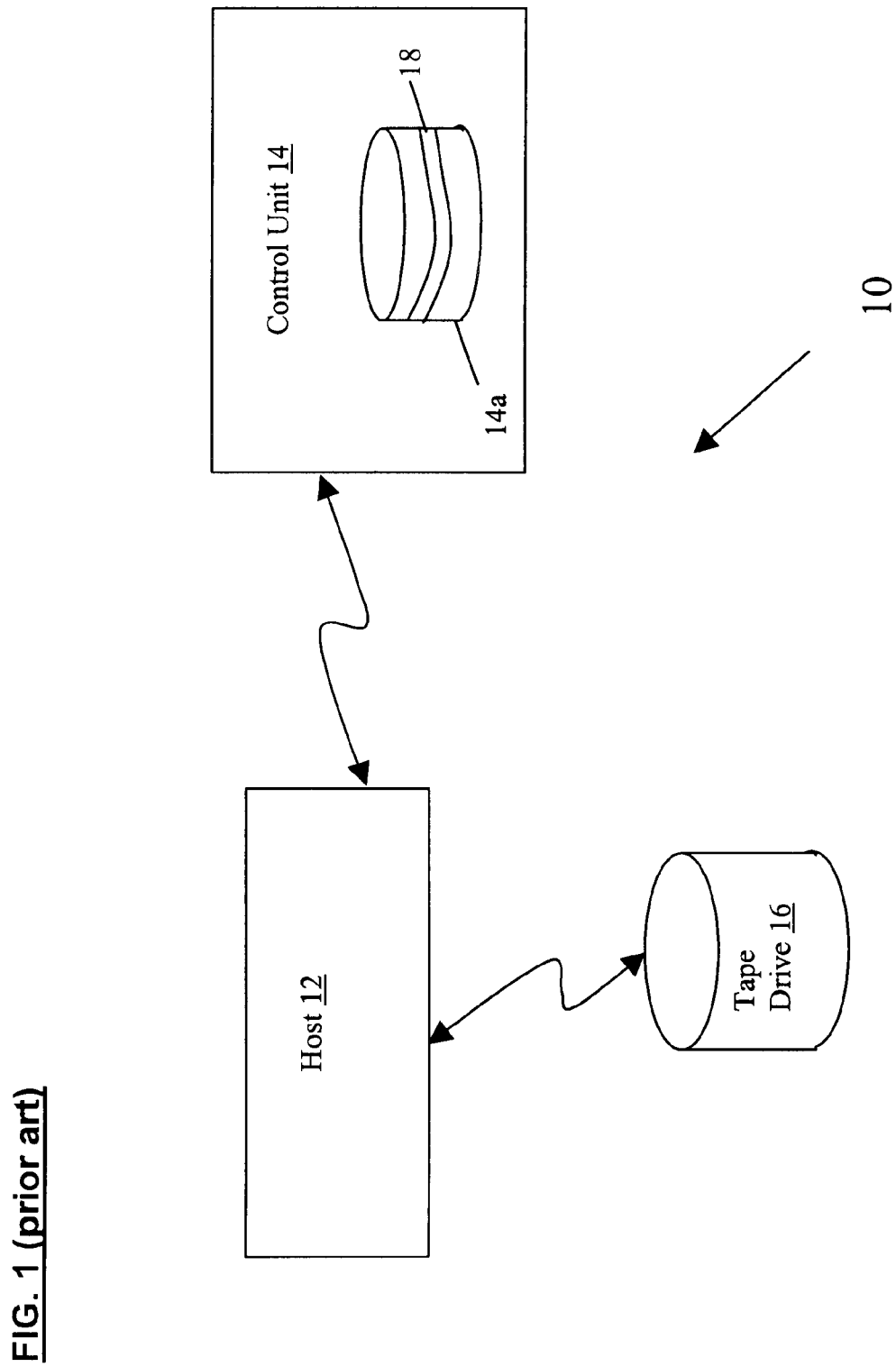
FIG. 1 schematically illustrates a prior art data storage and backup system.

FIG. 1 schematically illustrates a prior art data storage and backup system 10, including a host 12, a control unit ("CU") 14, and a tape drive backup device 16. CU 14 has a virtual volume 14a which is, for example, representative of data storage cylinders, known in the art, or complex mappings of distributed memory, such as illustratively shown in FIG. 2. Those skilled in the art understand that virtual volume 14a is commonly designed according to IBM standards. Virtual volume 14a can for example be model 3380s and 3390s from IBM. Tape storage device 16 is used to backup data from volume 14a.

In operation, host 12 writes data to CU 14 and into virtual volume 14a. By way of example, host 12 can write data in virtual volume 14a at disk X, cylinder X', track X", illustrated in FIG. 1 as data extent 18. CU 14 compresses such data prior to storage in storage volume 14a to improve storage capacity and data transfer efficiency. When host 12 makes a backup of data extent 18, CU 14 decompresses the compressed track image and sends the uncompressed data to host 12; and host 12 stores the data in tape drive 16. To restore data to virtual volume 14a, host 12 captures data from tape drive 16 and transfers the data to CU 14, which then compresses and restores data extent 18 to its original location within virtual volume 14a, i.e., at disk X, cylinder X', track X". Host 12 and/or CU 14 do not relocate data extent 18 to a new location within virtual volume 14a.

Figure 2:
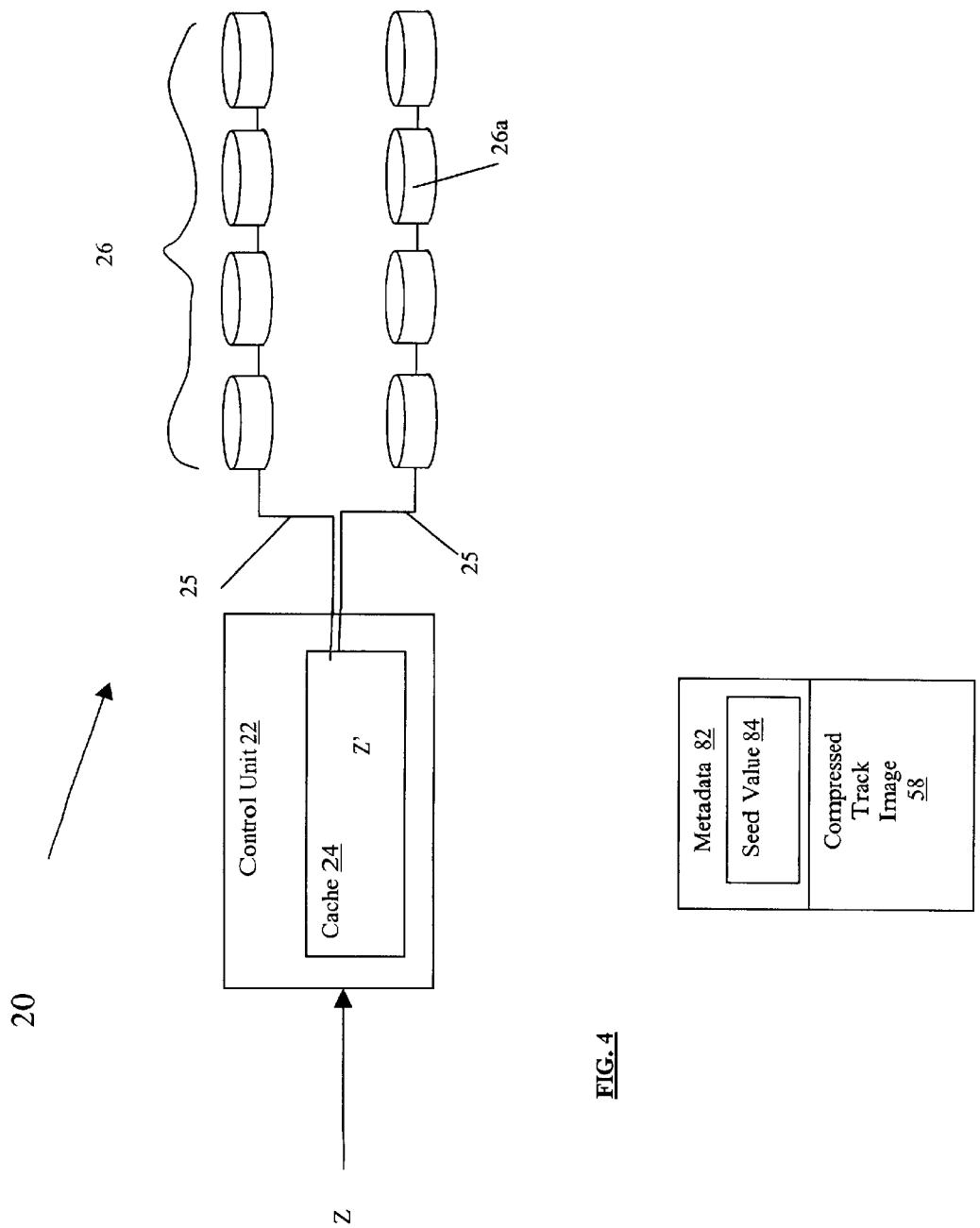
FIG. 2 schematically illustrates a prior art distributed memory arrangement.

FIG. 2 illustrates one prior art distributed memory arrangement 20. Specifically, FIG. 2 shows that a virtual volume (e.g., virtual volume 14a) within a control unit 22 (e.g., control unit 14) can be represented as a cache 24 coupled to distributed memory 26. Distributed memory 26 can for example include disks or cylinders 26a with tracks for storage therein. As known in the art, data Z entering control unit 22 is compressed and mapped to Z' within the distributed memory 26 via complex mapping detailed at the cache 24. Data bus 25 provides a data routing conduit between the cache 24 and the disks 26a. Data Z' can be decompressed, read and recovered to a connected host by known methods, as described in FIG. 1.

Figure 3:
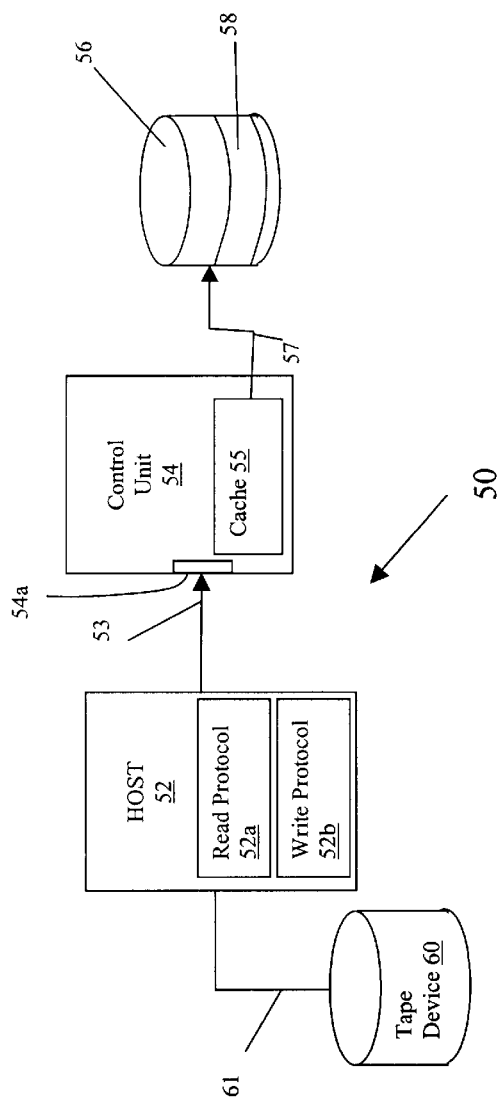
FIGS. 3, 3A and 3B schematically show a system, constructed according to the invention and in modes of operation, for storing and relocating compressed data tracks.
Figure 3A:
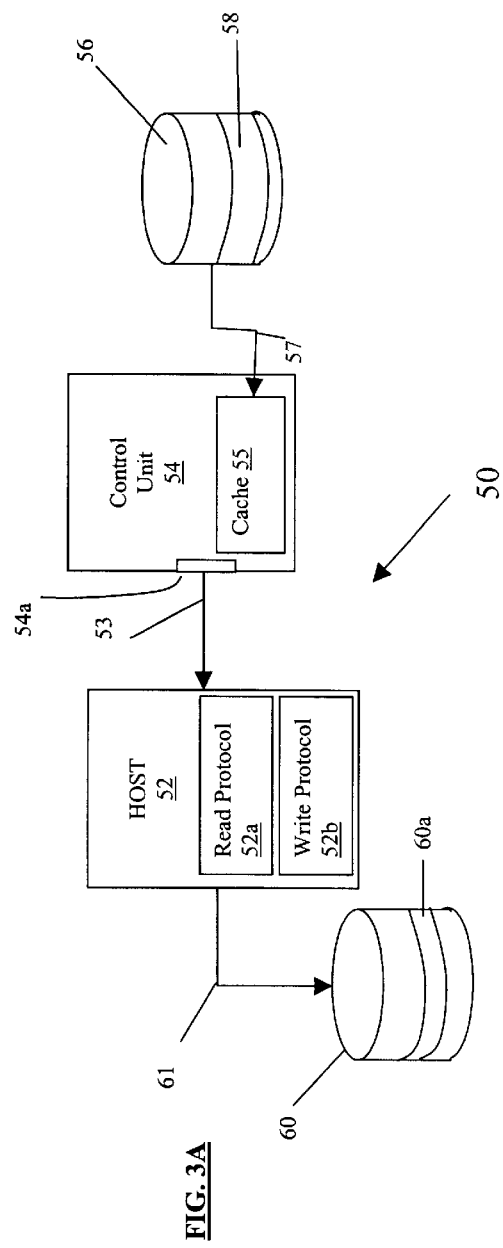
Figure 3B:
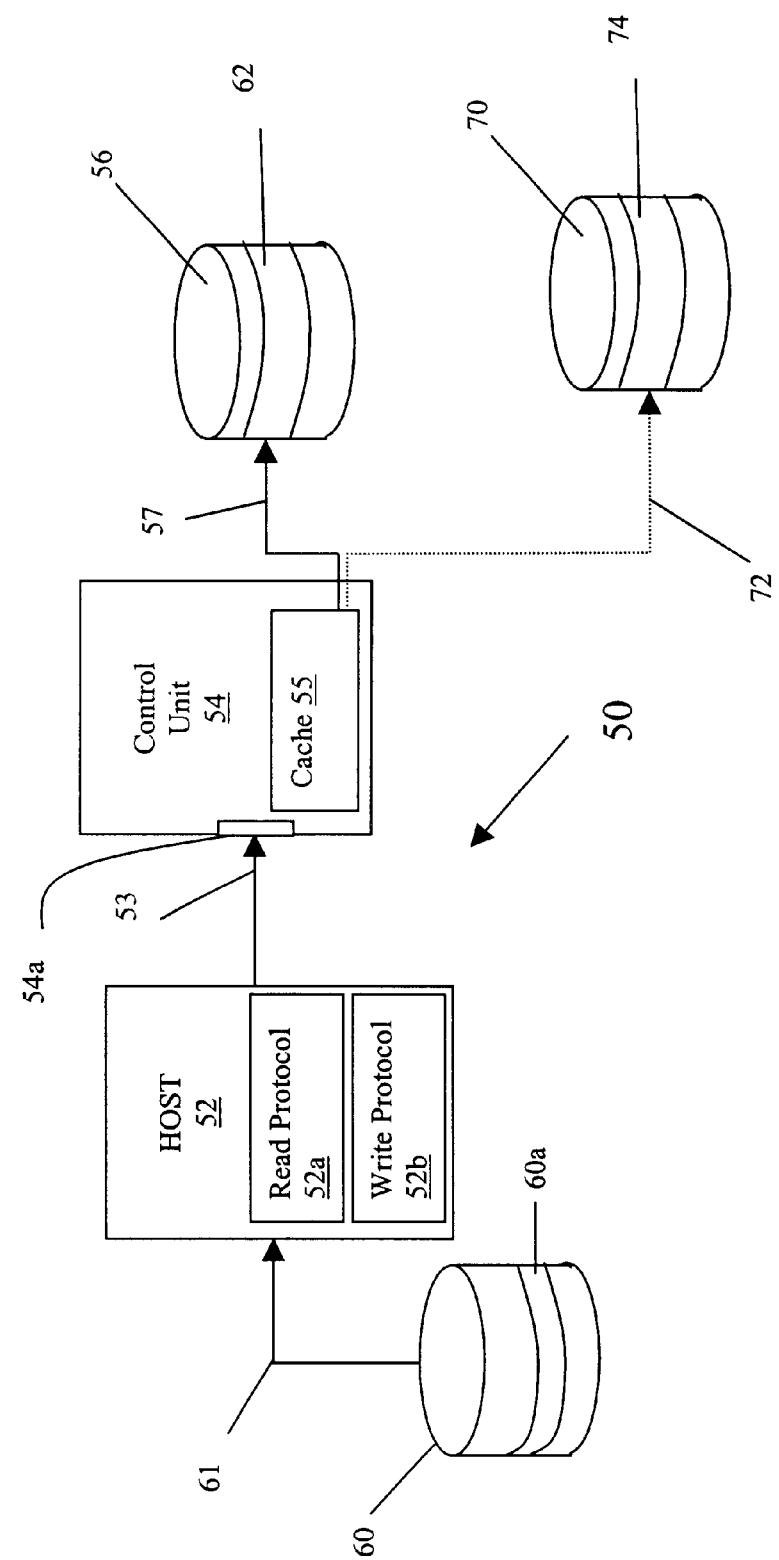

FIGS. 3–3B illustrate a system 50 constructed according to the invention. Among other functions, system 50 provides for relocating compressed data tracks to user-selected storage volumes, such as during data backup and restore. FIG. 3 shows system 50 writing a compressed track to a storage volume in a first mode of operation. FIG. 3A shows system 50 in a backup mode of operation. FIG. 3B shows system 50 in a restore mode of operation.

More particularly, system 50 includes a host 52 coupled to CU 54 via data bus 53. Data bus 53 can include a plurality of data paths, as known in the art. Host 52 stores data into storage volume 56 through CU 54. CU 54 has a cache 55 coupled to storage volume 56 via data bus 57; and cache 55 maps data into volume 56 according to known methods. Storage volume 56 illustratively shows one track 58 representative of compressed data assuming the extent within volume 56. Those skilled in the art should appreciate that storage volume 56 can be, and preferably is, a distributed memory arrangement of cylinders and tracks. Tape device 60 connects to host 52 through data bus 61 and is used by system 50 to backup data within storage volume 56. As illustrated in FIG. 3, system 50 is shown writing compressed track image 58 into storage volume 56.

As known in the art of virtual volume systems such as DASD, storage volume 56 can have many disks, cylinders, records and tracks. Each disk can have several cylinders; and each cylinder can have several tracks, each track having storage capacity. Records can fill entire tracks or portions of tracks. Data is spread among tracks and records through the associated cache and according to distributed memory methods known in the art.

CU 54 preferably includes an application specific integrated circuit ("ASIC") 54a, which compresses and alternatively decompresses data to and from CU 54. Specifically, if host 52 sends uncompressed data to CU 54 along bus 53, then ASIC 54a can compress the data for storage within volume 56, saving space. Likewise, if commanded by the host, CU 54 can decompress stored data, via ASIC 54a, so that host 52 receives uncompressed data. As described herein, CU 54 also sends compressed data to host 52, when commanded, for purposes of backup, restore and/or relocation. In this case, ASIC 54a is not used to decompress data sent from CU 54 to host 52; and data backed up in tape drive 60 is conveniently stored in compressed form.

Note that ASIC 54a is also not used to compress data when host 52 sends compressed data to CU 54. Rather, compressed data from host 52 to CU 54 is transmitted along bus 53 for mapping within storage volume 56 without further compression.

With further reference to FIG. 3A, system 50 is shown illustrating a backup of data, e.g., track 58, from storage volume 56 to tape device 60. Data backup is typically performed to safeguard data track 58 in a redundant, second storage volume; though data backup also occurs to manipulate or use storage volume 56 for other purposes while maintaining a copy of the original data track 58. In the data backup operational mode of FIG. 3A, host 52 reads data track 58 from storage volume 56 with read protocol 52a. Read protocol 52a for example takes the form of software that provides host 52 with capability to read the compressed track image 58. When transferring track image data 58 to host 52, CU 54 assigns and tags metadata to image 58. Metadata is shown illustratively in FIG. 4 and is described in more detail below. For purpose of illustration, the backup version of data track 58 is shown as data 60a in tape device 60.

Note that in the mode of operation shown in FIG. 3A, CU 54 does not decompress the data prior to transmission to host 52. Rather, compressed track image 58 is sent to host 52 in compressed form with metadata attached. Nevertheless, CU 54 has capability (i.e., at ASIC 54a) to decompress data for host 52, when commanded.

FIG. 3B shows system 50 restoring data 60a to storage volume 56; except that host commands change the location of the stored track image to location 62. Specifically, in achieving one object of the invention, a user of system 50 has the choice to relocate compressed data 60a to track location 62 through the metadata assigned to the track image 58. Host 52 writes data 60a into storage volume 56 with write protocol 52b. Write protocol 52a for example takes the form of software that provides host 52 with capability to write—and hence "restore" compressed track images into storage volume 56. Specifically, system 50 restores compressed data 60a to location 62 via the metadata assigned to data 60a. Location 62 is specified at host 52 by user commands.

Those skilled in the art should appreciate that the restore operation need not occur within the original storage volume 56. For purpose of illustration, FIG. 3B also shows an alternative storage volume 70 connected to CU 54 via data bus 72. If for example original data track 58 was stored in cylinder y in volume 56, compressed data associated with track 58 can for example be restored to track 74, cylinder v, in volume 70. Cylinders y and v represent any one cylinder within the associated storage volume 56, 70. As above, restoring data 60a to volume 56 or 70, and at selected cylinders and tracks within these volumes, is preferably determined by commands at host 52.

FIG. 4 illustrates data extent 58 and metadata 82 transferred to host 52 in the above operational mode of FIG. 3A. In that process, data extent 58 is preceded by metadata 82 which "self-defines" track image 58. Metadata 82 provides for relocation of compressed tracks by creating a description of the compressed track that is invariant with its currently assigned location within volume 56. When host 52 writes the compressed track back into storage volume 54, write protocol 52a uses the metadata to "restore" the track to the newly assigned location (e.g., location 62 or 74), if desired, Whenever a compressed track is decompressed by ASIC 54a, CU 54 appends a seed value 84 to the metadata as an identification tag for data extent 58. After the compressed track is written to a new location—e.g., to location 62 or 74, FIG. 4—the identification tag remains valid across the relocation even during the decompression process.

CU 54 understands when host 52 transmits compressed data with metadata 82. Even if host 52 originally transmits compressed images to CU 54, relocation such as described above can still occur though the metadata 82; and relocation can be accomplished through a single read and write operation by host 52. Seed value 84 establishes that the track is consistent such as through cyclic redundancy checking ("CRC"), known in the art.

In one embodiment, the invention utilizes the count field (known in the art), which specifies information such as cylinder, head and record numbers. In multi-virtual storage ("MVS") environments, the count field can be specified to identify the origination of each record. In accord with this embodiment, the CU modifies the count field, as appropriate, to specify the data extent as cylinder and head numbers for the redirected compressed track in each count field. Accordingly, the CU translates the data extents and modifies the count field based upon what is transferred by the CU. For example, if the count field describes the cylinder and head numbers of the extent within the tape drive 60, the CU moves the data into that extent and modifies the cylinder and head numbers, if needed, based upon the appropriate mapping. The count field can also be used in re-routing tracks to and from the CU.

This is significantly different from prior art systems which simply make a one-to-one copy of data extents, and count fields, into memory. Those skilled in the art should appreciate that certain systems do not utilize the count field and that other identifiers can be used to locate the origination of the data extent. In this case, when the count field is not used, the count field is not changed.

Read and Write Host Protocols

In the preferred embodiment of the invention, and with further reference to FIGS. 3–3B, host read protocol 52a sends a series of commands that are chained together during a read process. The first command (Define Extent) specifies the extent (i.e., the range of tracks) over which the read pertains. The second command (Locate record) specifies the start track and the mask of which tracks in a cylinder are read. The second command thus sets the orientation of which track is read first; and the mask dictates which subsequent tracks are read by skipping tracks that do not have the mask bit set.

The next read protocol commands are the Read Track Commands. There can, for example, be up to fifteen read track commands after the Locate Record Command, since there typically are fifteen tracks per cylinder.

Once these tracks are read into host 52, they can be written back to CU 54 (or into tape device 60) in a selected location by write protocol 52b. The write chain of commands starts with a Define Extent command, specifying the extent (i.e., the range of tracks) over which the write pertains. The second command (Locate Record Command) specifies the start track. A mask is not used in the write protocol process; and the chain of write commands may be as long as the extent. The next commands are a Write Command followed by one or more Write Next Track Commands. The first track that is sent by the Write Command is written to the location specified by the Locate Record Command. It does not matter where the track was read from, nor what its count field is, as the track is written to the location according to the Locate Record Command.

The Write Next Track Command writes data to the track that is incremental to the prior oriented track (i.e., the 'next' track ). This track and subsequent tracks are written to the orientation specified by their location in the chain relative to the Locate Record Command, without regard to where they were read from or to the count field specified within the write data. An alternative is to use the count field to place the tracks, without regard to where they were read from or to the orientation specified by a location relative to the Locate Record domain.

The invention thus attains the objects set forth above, among those apparent from preceding description. Since certain changes may be made in the above systems and methods without departing from the scope of the invention, it is intended that all matter contained in the above description or shown in the accompanying drawing be interpreted as illustrative and not in a limiting sense.

In view of the foregoing, what is claimed is:

1. A system for backup and relocation of compressed track images, comprising:
   a host, and
   a control unit for storing data, as a compressed track image, from the host and into a first location of a first storage volume, the control unit responding to a read command from the host to transmit the compressed track image to the host and assigning metadata to the compressed track image, the control unit responding to a read command from the host to relocate the compressed track image into a second location, different than the first location, of a second storage volume, the metadata specifying the second location where the compressed track image is relocated.

2. A system according to claim 1, further comprising a compression and decompression circuit for compressing and alternatively decompressing the data, the control unit compressing uncompressed data from the host and responding to host commands to decompress data selectively.

3. A system according to claim 1, further comprising a compression and decompression circuit for compressing and alternatively decompressing the data.

4. A system according to claim 1, further comprising a backup storage device, the host transmitting the compressed track image to the device for backup of the data.

5. A system according to claim 1, wherein the host comprises read protocol for reading the compressed track image from the control unit.

6. A system according to claim 1, wherein the host comprises write protocol for writing the compressed track image to the control unit.

7. A system according to claim 1, wherein the control unit comprises means for assigning a seed value to the metadata, wherein the data remains identifiable across relocation.

8. A method for backup and relocation of compressed data, comprising:
   storing compressed data at a first location of a first storage volume,
   backing up the compressed data by reading the compressed data and storing the compressed data in a second storage volume; and
   relocating the compressed data by reading the compressed data in the second storage volume and storing the compressed data in a location other than the first location as specified by metadata associated with the compressed data.

9. The method of claim 8, wherein the relocated compressed data is stored in the first storage volume in a second location different from the first location.

10. The method of claim 8, wherein the relocated compressed data is stored in a third storage volume.

11. The method of claim 10 wherein the first and third storage volumes are virtual volumes.

12. The method of claim 11 wherein the first and third virtual volumes reside on the same physical volume and the relocated compressed data is stored in a second location different from the first location.

13. A method for relocating data to a storage volume, comprising the steps of:
   storing compressed data at a first location in a first storage volume;
   associating metadata to the compressed data;
   transmitting the compressed data to a host; and
   relocating the compressed data at a second location, different than the first location, in a second storage volume, the metadata specifying the second location where the compressed data is relocated.

14. The method of claim 13, further comprising the step of backing up the compressed data in a storage device after transmitting the compressed data to the host.

15. The method of claim 13, wherein the step of storing the compressed data comprises storing the compressed data to a location corresponding to the first location.

16. The method of claim 13, wherein the second storage volume corresponds to the first storage volume.

17. The method of claim 13, further comprising the steps of decompressing the compressed data and assigning a seed value to the metadata, wherein the compressed data remains identifiable across relocation.

18. The method of claim 13, wherein the step of relocating comprises storing the compressed data at the second location with a compatible format size as the compressed data at the first location.

19. The method of claim 13, further comprising the step of automatically modifying a count field of the compressed data to match the second location.

20. A method for relocating data to a storage volume, comprising the steps of:
   storing a compressed track image of the data at a first location in a first storage volume;
   tagging metadata to the compressed track image;
   transmitting the compressed track image to a host; and
   relocating the compressed track image at a second location, different than the first location, in a second storage volume, the metadata specifying the second location where the compressed track image is relocated.

21. A method of claim 20, further comprising the step of backing up the compressed track image in a storage device after transmitting the compressed track image to a host.

22. A method of claim 20, further comprising compressing the data prior to storing the compressed track image at the first location.

23. A method of claim 20, wherein the step of storing the compressed track image comprises storing the compressed track image to a location corresponding to the first location.

24. A method of claim 20, wherein the second storage volume corresponds to the first storage volume.

25. A method of claim 20, further comprising the steps of decompressing the compressed track image and assigning a seed value to the metadata, wherein the data remains identifiable across relocation.

26. A method of claim 20, wherein the step of storing comprises storing the compressed track image at a second location with a compatible format size as the compressed track image at the first location.

27. A method of claim 20, further comprising decompressing the compressed track image.

28. A method of claim 20, further comprising the step of automatically modifying a count field of the compressed track image to match the second location.

29. A method of claim 20, wherein the step of transmitting is preceded by the step of reading the compressed track image by a Read Protocol.

30. A method of claim 29, wherein the Read Protocol comprises executing one or more of Define Extent, Locate Record and Read Track Commands.

31. A method of claim 20, wherein the step of storing comprises the step of writing the compressed track by a Write Protocol.

32. A method of claim 31, wherein the Write Protocol comprises executing one or more of Define Extent, Locate Record, Write, and Write Next Commands.

33. A method of claim 31, wherein the step of writing by a Write Protocol comprises the step of specifying the second location through a count field preceding the compressed track image.

* * * * *